United States Patent [19]

Noriyuki

[11] Patent Number: 5,193,578

[45] Date of Patent: Mar. 16, 1993

[54] IRRIGATION LINE DRAIN VALVE

[76] Inventor: Steven W. Noriyuki, P.O. Box 754, Paul, Id. 83347

[21] Appl. No.: 795,817

[22] Filed: Nov. 21, 1991

[51] Int. Cl.⁵ .............................................. F16K 15/03
[52] U.S. Cl. .................................. 137/521; 137/527.6; 239/111
[58] Field of Search ..................... 137/107, 521, 527.6; 239/111

[56] References Cited

U.S. PATENT DOCUMENTS

| | | | |
|---|---|---|---|
| 1,438,973 | 12/1922 | Van Der Volgen | 137/107 |
| 1,863,919 | 6/1932 | Brooks | 239/111 |
| 2,480,391 | 8/1949 | Williamson | 62/1 |
| 2,512,695 | 6/1950 | Stout et al. | 277/71 |
| 2,561,296 | 7/1951 | Stout | 137/78 |
| 2,616,441 | 11/1952 | Roberts | 137/521 X |
| 2,647,533 | 8/1953 | Beymer | 239/111 X |
| 2,647,534 | 8/1953 | Freeman | 137/527.6 X |
| 2,791,228 | 5/1957 | Carr et al. | 137/107 |
| 2,926,686 | 3/1960 | Gheen | 137/217 |
| 2,946,342 | 7/1960 | Dopplmaier | 137/217 |
| 3,419,033 | 12/1968 | Shohan | 137/107 |
| 3,736,951 | 6/1973 | Purtell | 137/217 |
| 5,004,010 | 4/1991 | Huet | 137/521 |

Primary Examiner—Robert G. Nilson
Attorney, Agent, or Firm—Frank J. Dykas; Craig M. Korfanta; Ken J. Pedersen

[57] ABSTRACT

The invention is an automatic drain valve for irrigation pipelines. The valve is located at the end of the pipe, and comprises a pivoted, spring lever attached to the outside of the pipe and attached to a valve stem and seat.

3 Claims, 2 Drawing Sheets

IRRIGATION LINE DRAIN VALVE

BACKGROUND OF THE INVENTION

1. Technical Field

This invention relates to valves for pipelines, especially to automatic drain valves for portable irrigation pipelines. In particular, this invention relates to a spring-biased valve designed to provide for automatic draining of water from an irrigation pipeline whenever the flow of water in the pipe has been shut off.

2. Background Art

In irrigation systems using sprinklers, long conduits of aluminum pipe bring water to the area being irrigated. Such irrigation pipelines must often be moved to the next area to be irrigated, and it is advantageous if the water in the pipes can be readily drained, prior to moving them.

U.S. Pat. Nos. 2,512,695 (Stout et al.), 2,926,686 (Gheen), 2,946,342 (Dopplmaier), 3,419,033 (Shonan), and 3,736,951 (Purtell), disclose different automatic drain valves for irrigation pipelines. Generally, these valve designs utilize internally placed valves at locations along the length of the pipes, which valves are responsive to the pressure of the water in the pipes. These valve designs, however, require many expensive valves which are subject to clogging and plugging, and which, when plugged, are difficult to clean due to their internal design.

U.S. Pat. No. 2,561,296 (Stout), discloses a self-draining irrigation line which may be operated by a chain on one end of the line.

U.S. Pat. Nos. 2,480,391 (Williamson), and 2,791,228 (Carr et al.), disclose internally placed spring-biased relief valves.

Still, there is a need in the irrigation art for a single, reliable automatic drain valve for an irrigation pipeline, which valve may be easily cleaned.

DISCLOSURE OF INVENTION

What I have invented is:
An irrigation line drain valve comprising:
(a) a valve stem connected to a pivoted lever;
(b) said pivoted lever pivotally attached on its first end to the end of an irrigation line;
(c) said pivoted lever attached on its second end to the first end of a spring;
(d) said spring attached on its second end to the outside of the irrigation line;
(e) a discharge opening on the end of the irrigation line; and,
(f) a valve seat at said discharge opening for cooperating with said valve stem and said discharge opening.

From the practice of my invention, there is provided a single, reliable automatic drain valve for an irrigation pipeline, which valve may be easily cleaned.

BEST MODE FOR CARRYING OUT INVENTION

Figure 1:
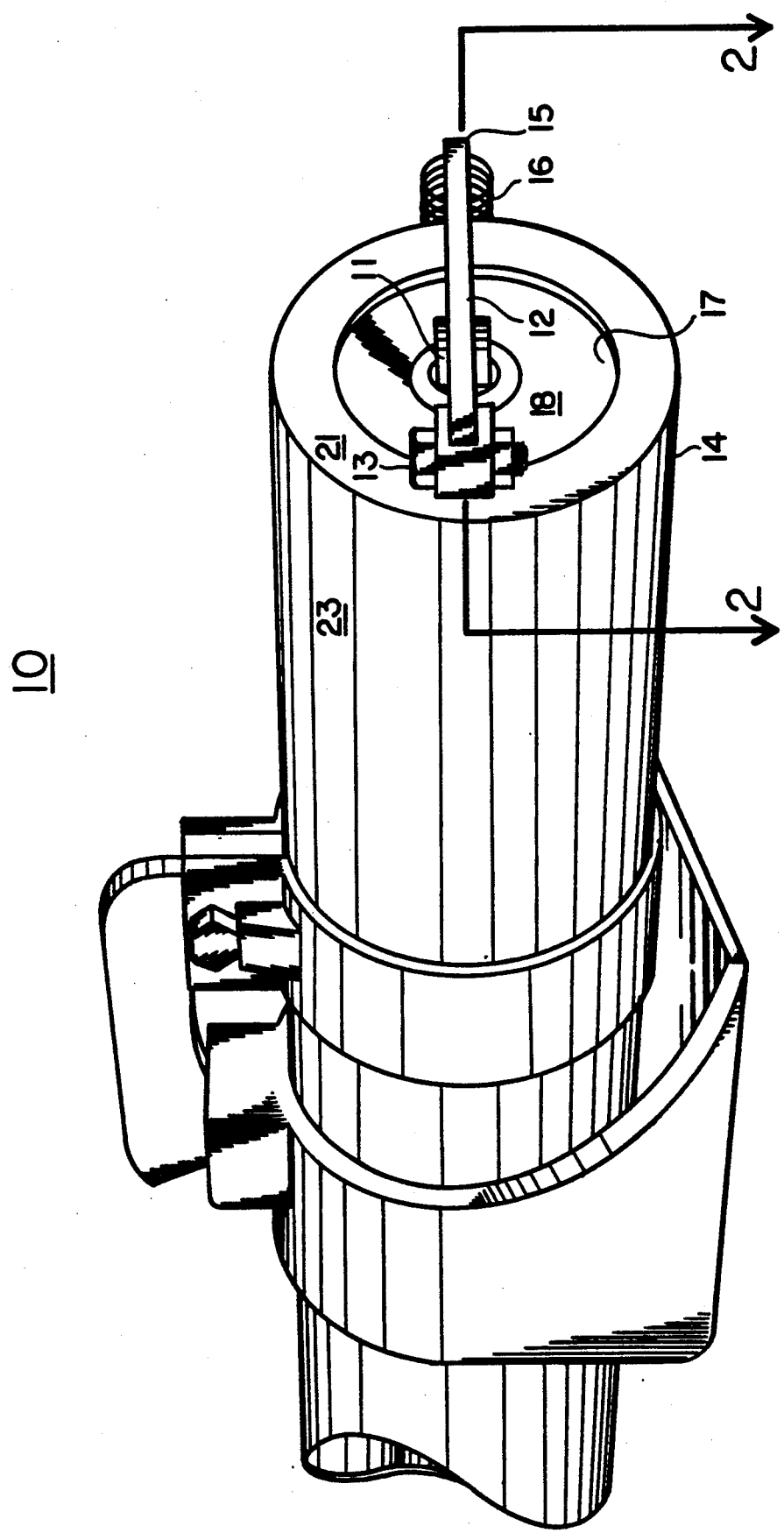
FIG. 1 is a side, perspective view of the drain valve of my invention.

Referring to FIG. 1, there is depicted a side, perspective view of my drain valve 10. Valve stem 11 is connected to pivoted lever 12, which is attached on its first end 13 to the end of the irrigation line 14. Lever 12 is attached on its second end 15 to spring 16. Line 14 has discharge opening 17 at its end, creating an end, peripheral surface 21 and valve seat 18 disposed inside line 14 at opening 17 for cooperating with valve stem 11 and the inside circumference 22 of discharge opening 17.

Figure 2:
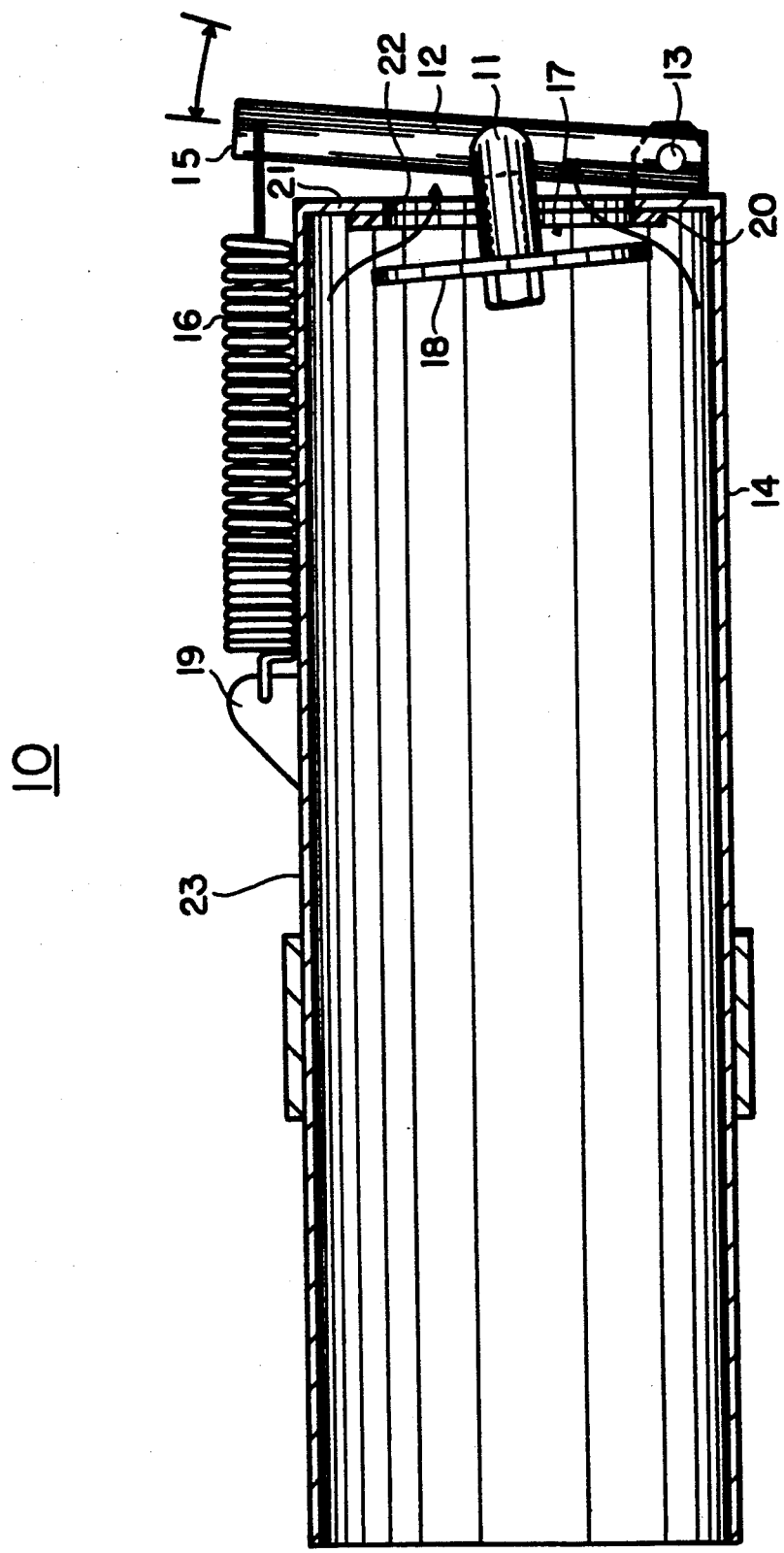
FIG. 2 is a top, cross-sectional view along the line 2—2 in FIG. 1.

Referring to FIG. 2, there is depicted a top, cross-sectional view of my invention along the line 2—2 in FIG. 1. Here, it is clear that spring 16 is attached to the second end 15 of lever 12 and to the outside of irrigation line 14 at tab 19 on side, elemental surface 23 of line 14. Optionally, there may be a gasket material 20 applied, for example, to the inside of the line 14 circumferentially around discharge opening 17 to aid in sealing the valve when it is in the closed position. With the valve in the open position as shown, the flow lines of water draining from the valve are depicted schematically by the arrows.

Valve stem 11 may be any appropriate means for connecting the central portion of pivoted lever 12 to valve seat 18 and extending through discharge opening 17 for opening and closing the valve. What has worked well for me has been a metal post slotted about 30° on its one end for accepting lever 12 at an angle and bolted on its other end to valve seat 18.

For valve seat 18, I used a flat disc about 20% larger in cross-sectional area than discharge opening 17. This way, there is sufficient overlap of the outer edges of valve seat 18 around discharge opening 17 for proper sealing of the valve. To aid also in sealing the valve, I recommend an optional gasket 20 made of rubber or other elastomeric material be placed around the inside circumference of discharge opening 17, or around the cooperating edge of valve seat 18.

Lever 12 is connected at an angle of about 30° to valve stem 11. This way, the lever 12 can pivot outside, and valve seat 18 can swing inside, line 14. The pivotal connection for lever 12 may be on the end, or cap, of the line 14, or as close as possible to it. This way, the lever 12 will be responsive to movement in the valve seat 18 and valve stem 11 which are also located near the end of line 14.

Lever 12 extends diametrically across the centerline of discharge opening 17 and beyond the opposite peripheral edge of line 14. There, it is attached on its second end 15 to spring 16, which is attached at tab 19 to the outside of line 14 on its side elemental surface 23. Spring 16 is stiff enough to bias end 15 towards the end of line 14, tending to keep valve stem 11 and valve seat 18 in the open position. However, spring 16 cannot be so stiff that it cannot be overcome by the "on" water pressure inside line 14 which pushes on the inside surface of valve seat 18, tending to keep it in the closed position. For 4 inch line with water pressure at approximately 30 psi, I found a four inch extension type spring with a barrel diameter of ¼ inch and a steel wire diameter of 1/64 inch to provide a proper balance between open and closed positions.

While there is shown and described the present preferred embodiment of the invention, it is to be distinctly understood that this invention is not limited thereto, but may be variously embodied to practice within the scope of the following claims.

What I claim is:

1. An irrigation line drain valve comprising:
    (a) an irrigation line with a side, elemental surface and an end, peripheral surface;

(b) a discharge opening in an end of said irrigation line, said discharge opening being adapted to receive a valve seat on its inside circumference;
(c) a valve seat disposed inside said irrigation line, said valve seat being adapted to cooperate with said inside circumference of said discharge opening;
(d) a valve stem connected on its one end to said valve seat, and being adapted to extend through said discharge opening into and out from said irrigation line, said valve stem being connected on its other end to the central portion of a pivoted lever;
(e) said pivoted lever connected at its central portion to said valve stem and pivotally attached at its first end to the end of said irrigation line, said lever extending diametrically across the centerline of said discharge opening and beyond the opposite peripheral edge of the end of said irrigation line, and said lever being attached on its second end to the first end of a spring;
(f) said spring attached on its first end to the second end of said pivoted lever, said spring being attached on its second end to said side, elemental surface of said irrigation line; so that said irrigation line drain valve automatically opens when the hydraulic pressure in the line drops below a predetermined amount.

2. The drain valve of claim 1 wherein a gasket material is applied to the said inside circumference of said discharge opening.

3. The drain valve of claim 1 wherein said spring is attached on its second end to a tab on the side, elemental surface of said irrigation line.

* * * * *